US012673450B2

(12) United States Patent
    Donovan

(10) Patent No.: US 12,673,450 B2
(45) Date of Patent: Jul. 7, 2026

(54) CORK COMPOSITES FOR ARTICLES OF FOOTWEAR AND METHODS FOR MAKING THEREOF

(71) Applicant: PUMA SE, Herzogenaurach (DE)

(72) Inventor: Patrick Donovan, Fuerth (DE)

(73) Assignee: PUMA SE, Herzogenaurach (DE)

( * ) Notice: Subject to any disclaimer, the term of this patent is extended or adjusted under 35 U.S.C. 154(b) by 195 days.

(21) Appl. No.: 18/535,398

(22) Filed: Dec. 11, 2023

(65) Prior Publication Data

US 2025/0187235 A1    Jun. 12, 2025

(51) Int. Cl.
    B29C 39/00    (2006.01)
    A43B 1/06    (2006.01)
    B29C 35/08    (2006.01)
    B29C 39/38    (2006.01)
    B29K 311/02    (2006.01)
    B29L 31/50    (2006.01)

(52) U.S. Cl.
    CPC .............. B29C 39/003 (2013.01); A43B 1/06 (2013.01); B29C 35/0805 (2013.01); B29C 39/38 (2013.01); B29C 2035/0855 (2013.01); B29K 2311/02 (2013.01); B29L 2031/504 (2013.01)

(58) Field of Classification Search
    CPC ... B29C 67/207; B29C 66/7481; B29C 39/38; B29C 35/0805; B29C 39/04; B29C 39/003; A43B 1/06
    See application file for complete search history.

(56) References Cited

U.S. PATENT DOCUMENTS

| | | | | |
|---|---|---|---|---|
| 2007/0074430 A1* | 4/2007 | Coomer | .............. | A43B 7/1425 |
| | | | | 36/145 |
| 2019/0084199 A1* | 3/2019 | Anabuki | ................. | B27N 7/00 |
| 2021/0221963 A1 | 7/2021 | Baker | | |
| 2023/0071487 A1 | 3/2023 | Urban Bru | | |

FOREIGN PATENT DOCUMENTS

| | | |
|---|---|---|
| CN | 105643756 B | 9/2018 |
| EP | 4212297 A1 | 7/2023 |

OTHER PUBLICATIONS

International Search Report with Written Opinion of PCT/EP2024/085287, mailed Jun. 10, 2025 (16 pages).

* cited by examiner

*Primary Examiner* — Stella K Yi

(74) *Attorney, Agent, or Firm* — Quarles & Brady LLP

(57)    ABSTRACT

A method of fabricating a cork composite material is disclosed herein. The method includes providing a plurality of cork particles, adding a binder material to the cork particles to form a mixture of the cork particles and the binder material, transferring the mixture to a mold, applying energy to the mixture, cooling the mixture, and removing the cork composite material from the mold. Further, the energy includes electromagnetic radiation that fuses the cork particles with the binder material. Cooling the mixture solidifies the mixture, thereby forming a cork composite material.

19 Claims, 15 Drawing Sheets

200

208

226

224

222

304

308

312

300

700

704

702

700

702

700

704

CORK COMPOSITES FOR ARTICLES OF FOOTWEAR AND METHODS FOR MAKING THEREOF

CROSS REFERENCE TO RELATED APPLICATIONS

Not applicable.

REFERENCE REGARDING FEDERALLY SPONSORED RESEARCH OR DEVELOPMENT

Not applicable

SEQUENCE LISTING

Not applicable

BACKGROUND

1. Field of the Invention

The present disclosure is directed to cork composites for articles of footwear and methods for making cork composites for articles of footwear. More specifically, the present disclosure is directed to a midsole that includes cork composite materials, and a method for creating the midsole.

2. Description of the Background

Various articles of footwear, particularly components of the sole of the articles of footwear, are be designed for numerous purposes, including increased shock absorption and comfort. These articles of footwear, including the sole for an article of footwear, are often made of synthetic chemicals and materials. Further, many of the materials used are not readily recycled, are not environmentally neutral, or may not be produced using sustainable methods of production.

Cork is a versatile natural material. Raw cork itself is lightweight, elastic, flexible, impermeable to gases or liquids, and imperishable. Additionally, raw cork is a good electrical, thermal, acoustic, and vibrational insulator. These unique properties of cork arise from its closed cell structure. In fact, the cells of cork are filled with a gas mixture similar to air which contributes to the capability of cork to recover after compressed. These mechanical properties of cork combined with it being a natural, renewable, and recyclable material make cork desirable for a variety of applications.

However, cork may not be available in desired shapes and sizes in its raw form. Further, cork may not be easily manipulated to form desired shapes and sizes in its raw form. As such, it is common to employ cork agglomerates made up of natural cork particles bonded together. With that said, common articles manufactured from agglomerated cork tend to be too fragile, too rigid, too hard, and/or too heavy for many applications. Even further, there is little to no ability to control, and/or adjust density levels or cushioning properties of a given cork composite.

Existing binding agents typically bond with cork in such a way that the resulting mechanical properties of the composite material and finished components fabricated from such composite material are dependent on and are limited by the mechanical properties of the cork itself, without benefiting from the mechanical properties of the polymer matrix material. Therefore, the mechanical properties of the finished component are typically no better than a component of the same form, made entirely from solid cork. Conversely, existing binding agents can bond with cork in such a way that the resulting mechanical properties of the composite material and finished components fabricated from such composite material are dependent on and are limited by the mechanical properties of the polymer matrix itself, without benefitting from the mechanical properties of cork. As such, the mechanical properties of the finished component may be no better than a component of the same form, made entirely from solid polymer.

There is a general desire for cork composites that are easy to manufacture, moldable, and have desirable and controllable mechanical properties (e.g., density, strength, elasticity, etc.). Additionally, there is a general desire for cork composites that are softer, more flexible, and more durable than natural cork. There is a general desire for cork composites that are at least roughly as soft, flexible, and durable as synthetic foams used, for example, in footwear.

For example, known methods of manufacturing lignocellulose and softwood based composite materials are described, respectively, in U.S. Pat. Pub. No. 2020/017688 A1 and Chinese Pat. Pub. No. 105643756A. Further, European Pat. Pub. No. 3 829 839 A1 teaches thermoplastic elastomer cork composite materials and methods of making the same. The foregoing examples of the related art and limitations related thereto are intended to be illustrative and not exclusive.

Additionally, despite the aforementioned publications, there is still a need to improve the composite materials for numerous applications, including materials for articles of footwear, such as a midsole. For one, there can still be inconsistencies observed between the products that result from the aforementioned exemplary methods. For example, non-bonded or cured cork granules may still be present in the cork composites and improving the method to create cork composites with less non-bonded or cured cork composites is desired. Further, it is desirable to improve the efficiency of the methods of producing the cork composites, such as lowering the cycle time of the method used to produce the cork composite materials or reduce the energy consumed during the methods. Other limitations of the related art will become apparent to those of skill in the art upon a reading of the specification and a study of the drawings.

SUMMARY

An article of footwear, as described herein, may have various configurations. The article of footwear may have an upper and a sole structure connected to the upper.

In one aspect, a method of fabricating a cork composite material is disclosed. The method includes providing a plurality of cork particles, adding a binder material to the cork particles to form a mixture of the cork particles and the binder material, transferring the mixture to a mold, applying energy to the mixture, cooling the mixture, and removing the cork composite material from the mold. In this embodiment, the energy includes electromagnetic radiation and applying energy to the mixture fuses the cork particles with the binder material. Additionally, cooling the mixture solidifies the mixture, thereby forming the cork composite material.

In some embodiments of the method, the electromagnetic radiation is applied using a microwave. In some embodiments, the energy includes microwave radiation. In some embodiments, the energy is applied for less than 30 seconds.

In some embodiments of the method, after transferring the mixture to the mold, and before removing the cork composite material from the mold, no external pressure is applied to the mold.

In some embodiments of the method, cooling the mixture includes contacting the mold with a liquid. In some embodiments of the method, the mold includes channels, wherein the channels are configured to direct a flow of the liquid.

In another aspect, a method of fabricating a midsole of an article of footwear containing cork composite material is disclosed. The method includes providing a plurality of cork particles, adding a binder material to the cork particles to form a mixture of the cork particles and the binder material, transferring the mixture to a mold configured with a cavity in the shape of the midsole, applying energy to the mixture, cooling the mixture, and removing the midsole from the mold. Here, the energy is applied using a microwave and applying energy to the mixture fuses the cork particles with the binder material to form the cork composite material. Further, cooling the mixture solidifies the cork composite material in the shape of the midsole.

In some embodiments, the energy includes microwave radiation and the energy is applied for less than 30 seconds. Further, cooling the mixture may include contacting the mold with a liquid. Additionally, the mold may also include channels and the channels may be configured to direct a flow of the liquid. Even further, after transferring the mixture to the mold, and before removing the midsole from the mold, no external pressure may be applied to the mixture, the mold, and the midsole.

In another aspect, a method of fabricating a midsole of an article of footwear containing cork composite material is disclosed. Here, the method includes providing a mixture having cork particles and a binder material, transferring the mixture to a mold, and applying energy to the mixture, wherein the energy applied to the mixture includes electromagnetic waves.

In further embodiments, the electromagnetic waves may be applied to the mixture using a microwave, and the energy may be applied for less than 30 seconds.

Other aspects of the article of footwear, including features and advantages thereof, will become apparent to one of ordinary skill in the art upon examination of the figures and detailed description herein. Therefore, all such aspects of the article of footwear are intended to be included in the detailed description and this summary.

DETAILED DESCRIPTION OF THE DRAWINGS

Figure 1:
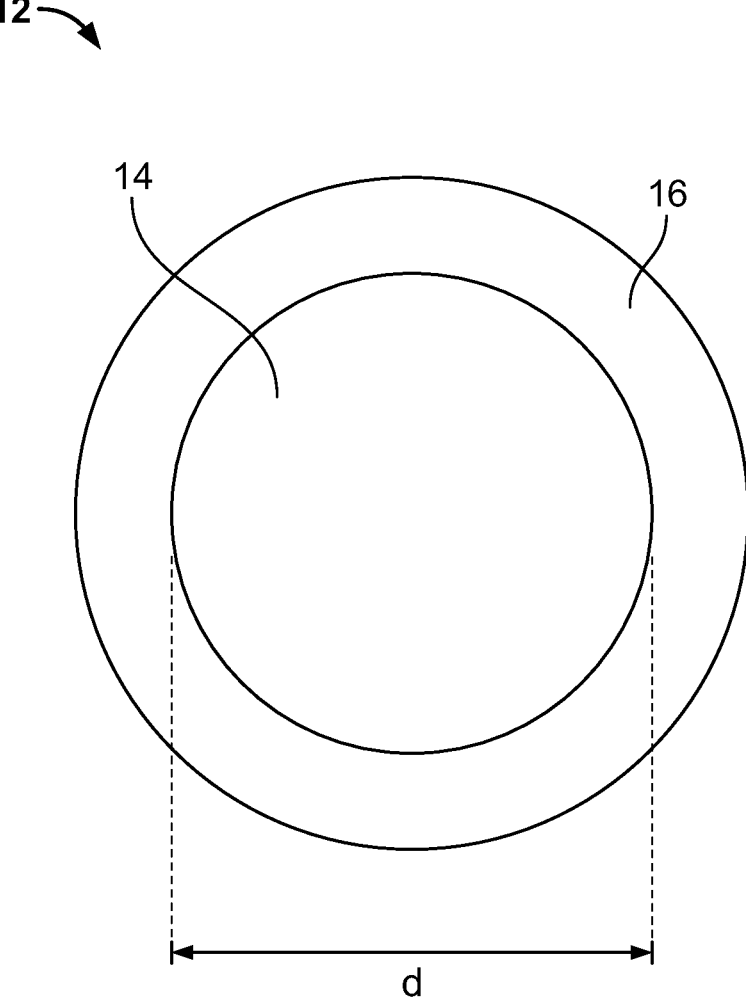
FIG. 1 is a schematic diagram of a cross-section of a cork composite granule according to one aspect of the present disclosure.

The following discussion and accompanying figures disclose various embodiments or configurations of a composite material that may be used or incorporated into an article, such as an article of footwear or shoe. As will be further discussed herein, concepts or aspects of the composite material may be applied to or incorporated into articles of footwear, articles of clothing, accessories, athletic equipment, or any article that may use a fabric or textile material.

For example, concepts of the composite material may be applied to or incorporated into articles of footwear that are considered athletic articles of footwear or sports shoes, such as running shoes, tennis shoes, basketball shoes, cross-training shoes, football shoes, golf shoes, hiking shoes, hiking boots, ski or snowboard boots, soccer shoes or cleats, walking shoes, track cleats, or any athletic article of footwear utilizing an upper. The concepts associated with embodiments of the present disclosure may also be applied to a wide range of other footwear and footwear styles, such as non-athletic articles of footwear, including dress shoes, sandals, loafers, slippers, or heels.

In addition to footwear, particular concepts described herein may also be applied and incorporated in other types of apparel or other athletic equipment, including articles of clothing (e.g., shirts, shorts, pants, hats, socks, calf sleeves, headbands, wristbands, arm sleeves, gloves, etc.), helmets, padding or protective pads, and shin guards. Even further, particular concepts described herein may be incorporated in insoles, cushions, backpack straps, golf clubs (e.g., a golf club grip), or other consumer or industrial products. Accordingly, concepts described herein may be utilized in a variety of products.

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about"

and "approximately" refer to a range of values ±5% of the numeric value that the term precedes.

The terms "weight percent," "wt-%," "percent by weight," "% by weight," and variations thereof, as used herein, refer to the concentration of a substance or component as the weight of that substance or component divided by the total weight, for example, of the composition or of a particular component of the composition, and multiplied by 100. It is understood that, as used herein, "percent," "%," and the like may be synonymous with "weight percent" and "wt-%."

In one aspect, the present disclosure is directed to an article of footwear or components of an article of footwear and methods for fabricating the article of footwear or components of the article of footwear. Components of the article of footwear include a midsole made of cork or cork composite material. The methods for creating components of the article of footwear, such as the midsole, include providing a plurality of cork particles and adding binder material to the cork particles to form a mixture of the cork particles and the binder material. The methods also include transferring the mixture to a mold and applying energy to the mixture. When applied, the energy fuses the cork particles with the binder material to form the cork composite material. The method also includes cooling the mixture and removing the cork composite mixture material from the mold. The method provides a high quality, homogenous, and stable product that is an improvement upon traditional molding techniques while reducing energy consumption and cycling time.

Figure 2:
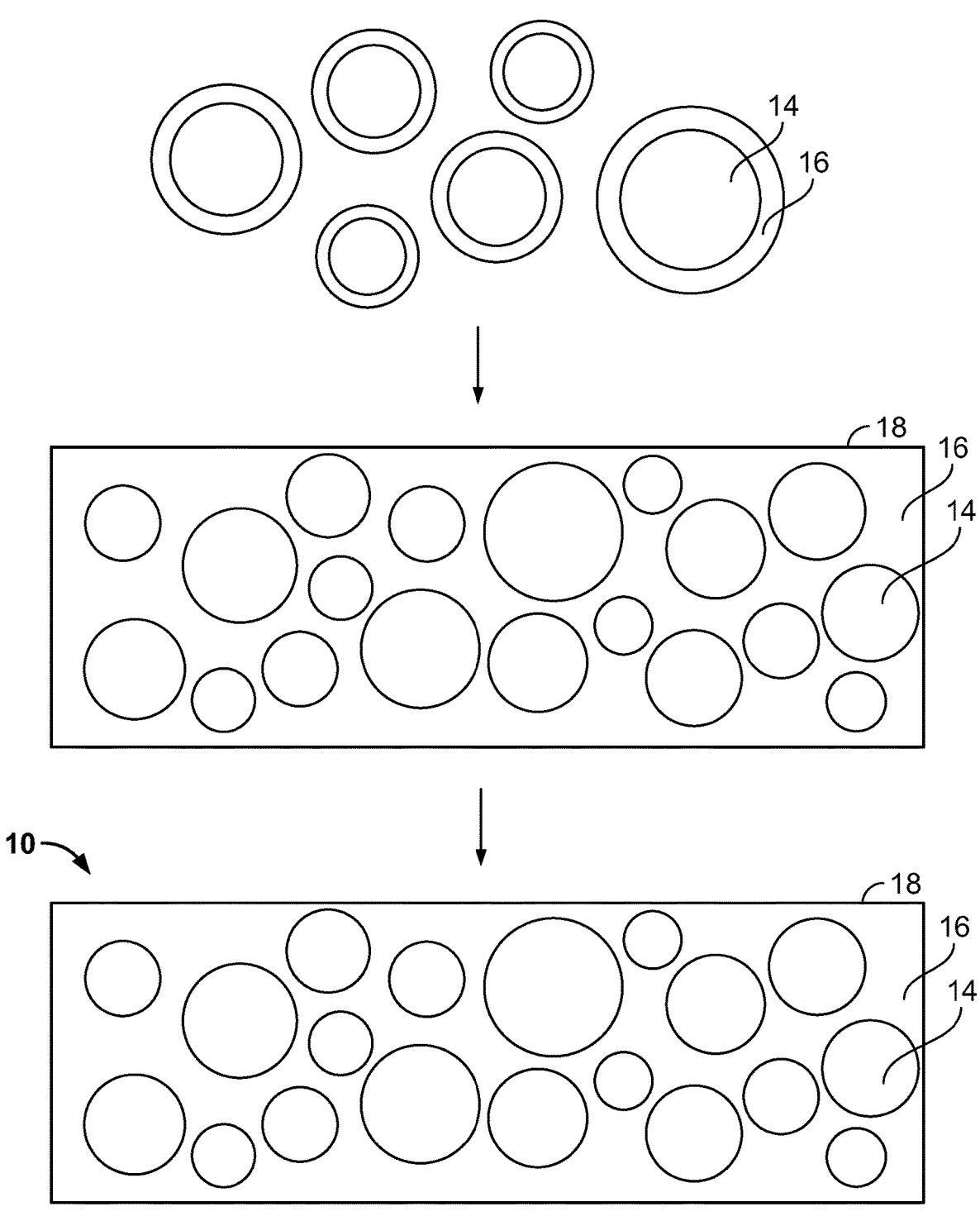
FIG. 2 is a schematic diagram of a method for manufacturing an article with the composite cork granules of FIG. 1, according to one aspect of the present disclosure.

With reference to FIGS. 1 and 2, a cork composite material 10 according to aspects of the present disclosure is shown. First, the cork composite material 10 may include a plurality of cork composite granules 12, each of which include a cork particle 14 and a binder material 16, such as a polymer binder, surrounding the cork particles 14 (see FIG. 1). Further, with specific reference to FIG. 2, the cork composite material 10 may include a plurality of cork composite granules embedded in a matrix 18 of binder material 16.

The cork composite material 10, as well as the cork composite granules 12 may be fabricated using a variety of methods. For example, with reference to FIG. 2, the cork composite granules 12 may be first coated in the binder material 16 by a chemical method, such as using solvents, physiochemical methods, or physical methods. Additionally, non-limiting examples of physical methods for coating the polymer material 16 onto the cork composite granules 12 may also include air suspension (e.g., in a fluidized bed reactor), spray drying, spray congealing, granulation or pan coating (e.g., dispersion-based pan coating or hot melt spray). Next, the cork composite granules 12 may be mixed together with other cork composite granules 12 to form the matrix 18, and then the cork composite granules 12 may be fused to form the cork composite material 10.

Typically, during this manufacturing process, a number of cork composite materials 10 may be rejected or insufficient because of bonding issues between the cork composite granules 12 of the cork composite materials 10. For example, a defect may be observed and felt when cork composite materials 10 are formed using known methods in the art, which produce cork composite materials 10 with cork composite granules 12 that are not well bonded or not bonded at all. The method disclosed herein overcomes such issues and teaches a method with improved bonding and improved fusion of cork composite granules 12, thereby creating a cork composite material 10 that is superior to other cork composite materials known in the art. Additionally, as will be discussed, the method of the present disclosure reduces cycle time, energy consumption, and cooling time to produce a superior and more consistent cork composite material 10. Further, as will also be discussed herein, the mold disclosed herein further assists with producing the superior and more consistent cork composite material 10.

Figure 3:
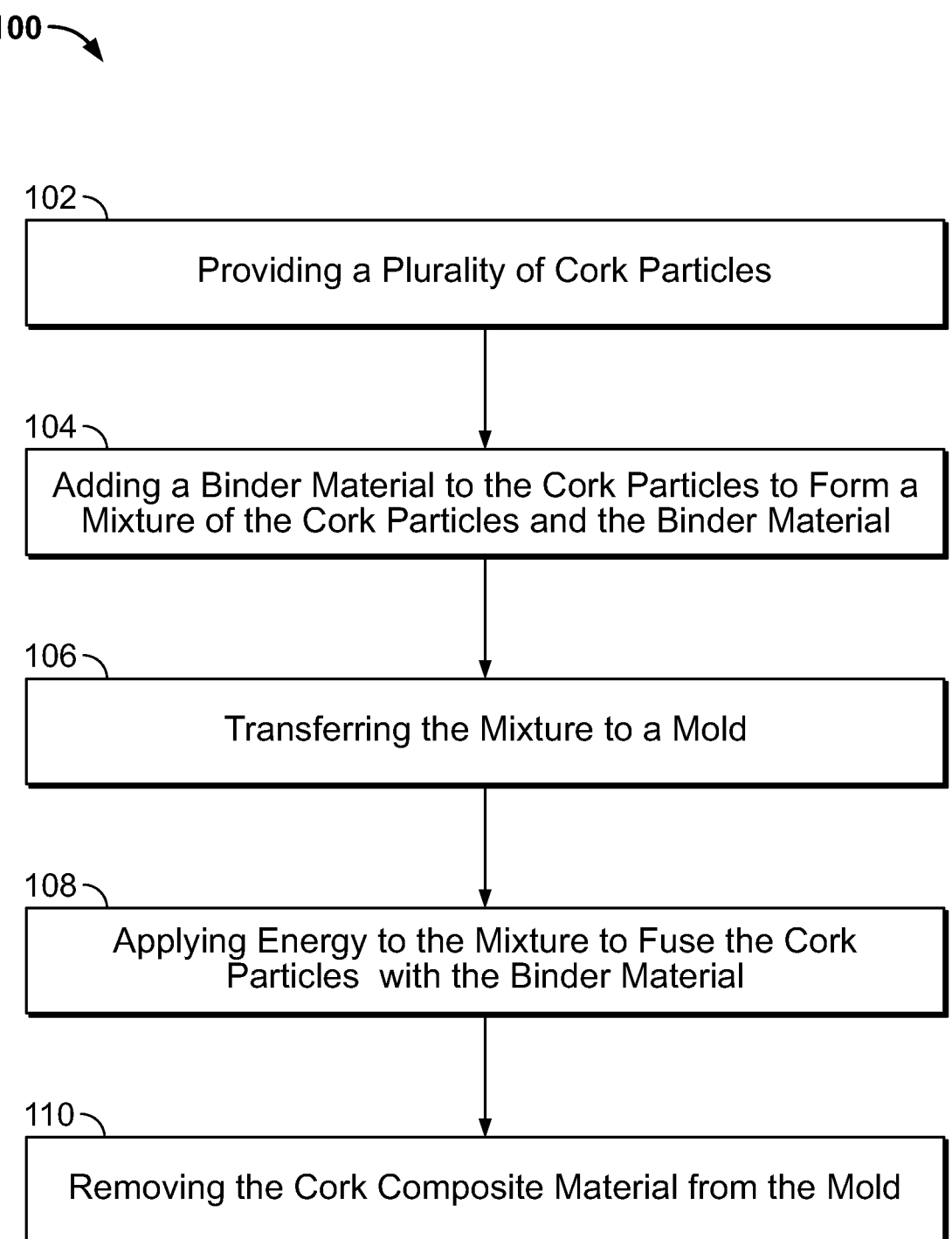
FIG. 3 is a flow chart of a method for manufacturing the cork composite material, according to one aspect of the present disclosure.

The method of manufacturing the cork composite material 10 may generally include several steps and a method 100 for manufacturing the cork composite material 10 according to a particular aspect of the present disclosure is depicted in FIG. 3. Here, the method first includes a step 102, which includes providing a plurality of cork particles, such as the cork particles 14. The cork particles may be unadulterated cork particles or may be cork particles mixed with, coated with, or bound to, an additive. Additives may include, but are not limited to foams, matrices, plastics, natural fibers, and polymers. Additionally, the cork particles may be sourced from newly harvested cork (e.g., virgin cork) or recycled cork. In other embodiments, the cork composite material may include cork-infused yarn.

The cork particles provided in step 102 may be of various sizes, shapes, and from various sources. For example, the cork particles may have a diameter or maximal dimension d (see FIG. 1) of greater than about 0.1, 0.2, 0.3, 0.4, 0.5, 1.0, 1.5, 2.0, 2.5, 3.0, 3.5, 4.0, 4.5, or 5.0 mm. In some embodiments, the cork particles may have a diameter or maximal dimension d of between about 0.1 mm and about 5.0 mm. In some embodiments, the cork particles have a diameter or maximal d of between about 0.2 mm and about 4.0 mm. In even further embodiments, the cork particles may have a diameter d that is between about 0.5 and about 1.0 mm. The cork particles may be of low density (e.g., less than 45 kg/m$^3$), medium density (e.g., between 45 kg/m$^3$ and 55 kg/m$^3$), or high density (e.g., greater than 55 kg/m$^3$), or a mixture thereof.

In some embodiments, the method 100 further includes a step 104 of adding a binder material, such as the binder material 16, to the cork particles to form a mixture of the cork particles and the binder material. As used herein, the term "binder" refers to a compound or substance that adheres solid constituents together to form a heterogeneous mixture of different components. For example, the binder material may be a thermoplastic binder that can be melted, then formed/poured into a shape that becomes hard when cooled.

In some embodiments, the binder material includes a thermoplastic or thermoplastic elastomer comprising or consisting of a styrene block co-polymer, a styrene-ethylene-butylene-styrene polymer, a styrene-butadiene-styrene polymer, a styrene-butylene-styrene polymer (e.g., RAPLAN™, provided by Trinseo Europe GmbH Limited Liability Company, Switzerland, Zugerstrasse 231 Horgen Switzerland CH-8810), a styrene-ethylene-butadiene-styrene polymer, a styrene-isoprene-styrene polymer, a thermoplastic olefin polymer, a thermoplastic polyurethane, and/or combinations of such thermoplastic elastomers thereof. In some embodiments, the binder material includes a biopolymer (e.g., a polymer derived from naturally occulting materials) comprising or consisting of a corn-based biopolymer (e.g., an ethanol-based polymer), an algae- or algae oil-based polymer, or a soybean oil-based polymer.

The mixture of cork particles and binder material may include any percentage of cork particles by weight. In some embodiments, the mixture includes about 5 wt. %, about 10 wt. %, about 20 wt. %, about 30 wt. %, about 40 wt. %, about 50 wt. %, about 60 wt. %, about 70 wt. %, about 80 wt. %, about 90 wt. %, or about 95 wt. % cork particles, or approximations thereof, with the remaining percentage including at least 1 wt. % of a binder material.

In some embodiments, the method 100 further includes a step 106 of transferring the mixture to a mold—e.g., a mold 200 (see FIG. 4, for example), which will be further discussed herein. Here, the step 106 may include an initial step of pre-heating the mold in an oven for an amount of time (e.g., 2 hours) before the mixture is transferred to the mold and before production starts. Pre-heating the mold aims to increase the temperature of the mold to a predetermined minimum temperature. In some embodiments, the predetermined minimum temperature is about 60° C., or about 70° C., or about 80° C., or about 90° C., or about 100° C., or any range therebetween. Additionally, pre-heating the mold may take between about 10 minutes and about 60 minutes, or between about 20 minutes and about 40 minutes, or around 30 minutes. Further, the pre-heating the mold may occur on a varied basis, such as only between every three cycles of the method 100.

Next, in some embodiments, the method 100 also includes a step 108 of applying energy to the mixture. Here, this step includes applying energy to the mixture to fuse the cork particles with the binder material. The energy applied to the mixture may effectively heat the mixture to a fusion temperature (e.g., a temperature where the cork particles and the binder material can fuse). Additionally, step 108 may effectively change the state of the mixture from a liquid state to a solid state form.

For example, in some embodiments, the mixture is heated to a fusion temperature of at least about 60° C. In some embodiments, the mixture is heated to a fusion temperature of at least about 65° C. In other embodiments, the mixture is heated to a fusion temperature of at least about 70° C. In further embodiments, the mixture is heated to a fusion temperature of between about 60° C. and about 75° C. In other embodiments, the mixture is heated to a fusion temperature of between about 130° C. and about 160° C., between about 160° C. and about 200° C., or equal to or greater than about 160° C. In even further embodiments, the fusion temperature to which the mixture is heated is dependent on the composition of the cork granules or binding material. For example, the fusion temperature to which the mixture is heated may be dependent on the glass transition temperature and/or melting temperature of the binding material. In particular, it may be desirable for the fusion temperature to which the mixture is heated to be lower than the glass transition temperature of a hard phase of binding material.

In particular, step 108 may include applying energy to the mold or to the mixture using a microwave, or the energy applied to the mixture, or the mold, may include electromagnetic radiation. In some particular embodiments, the energy applied is microwave radiation ranging from about 300 MHz to about 30 GHz. This range of the electromagnetic spectrum is often used by "microwave" ovens or heaters. The microwave frequencies used may be greater than about 750 MHz, greater than about 1.5 GHz, greater than about 2.25 GHz, or greater than about 3.0 GHz. For example, the microwave frequency may be approximately about 915 MHz. In some embodiments, the energy applied may be infrared radiation (far infrared, mid infrared, or near infrared) ranging from about 300 GHz to about 430 THz. In some embodiments, the energy applied is radio wave radiation (e.g., low frequency (LF), medium frequency (MF), or very high frequencies (VHF)) having frequencies ranging from 30 about kHz to about 30 MHz. For example, the energy applied may be an induction heating system that utilizes radiation between about 30 kHz and about 1.5 MHz, or between about 50 kHz and about 200 kHz. In some embodiments, the power applied by heating devices ranges from about 1 kW to about 500 kW, from about 3 kW to about 300 kW, and/or from about 50 kW to about 200 kW. In particular embodiments, the power applied by the device ranges between about 1 kW to about 20 kW, or between about 5 kW to about 20 kW, or between about 6 kW to about 18 kW. For instance, the power applied by the heating device may be approximately 15 kW.

In some embodiments, the energy applied to the mixture or the mold so that the mixture reaches fusion temperature is applied for less than about 1 minute. In other embodiments, the energy applied to the mold so that the mixture reaches fusion temperature is applied for less than about 45 seconds. In some embodiments, the energy applied to the mold so that the mixture reaches fusion temperature is applied for less than about 30 seconds. In some embodiments, the energy applied to the mold so that the mixture reaches fusion temperature is applied for less than about 15 seconds. In some embodiments, the energy applied to the mold so that the mixture reaches fusion temperature is applied for less than about 10 seconds. In some embodiments, the energy applied to the mold so that the mixture reaches fusion temperature is applied for less than about 5 seconds. In some embodiments, the energy applied to the mold so that the mixture reaches fusion temperature is applied for less than about 3 seconds. For example, in some embodiments, the energy applied to the mold so that the mixture reaches fusion temperature is applied for is, or is approximately, about 25 seconds.

Here, it was surprisingly and unexpectedly observed that fusing the mixture of cork composite materials and binder material using a microwave or electromagnetic radiation created a cork composite material that is superior to those known in the art. More specifically, the use of a microwave and electromagnetic waves to the mixture or mold fused the cork particles together to create a cork composite material with less defects, compared to cork composites produced using methods known in the art. Additionally, the use of a microwave or electromagnetic waves decreased the cycle time, energy consumption, and cooling time needed.

In some embodiments, the method 100 may further include a step 110 of cooling the mixture. Here, the step 110 may include cooling the mixture to solidify the mixture and form the cork composite material, such as the cork composite material 10. In some embodiments, the step 110 of cooling the composite material may be performed by cooling the external surface of the mold in which the cork composite material resides. For example, a cooling air or liquid may be applied to the external surface of the mold. Alternatively, or in addition, the mold or cork composite material may be cooled by placing the mold or cork composite material on a cooling rack or table, which may draw heat from the mold or cork composite material.

The step 110 of cooling the mixture may include cooling the mixture for a predetermined amount of time. For example, in one embodiment, the step 110 may include cooling the mixture for a predetermined amount of time between about 5 minutes and 1 hour, or between about 10 minutes and about 40 minutes, or between about 15 minutes and about 30 minutes. Further, the step 110 of cooling the mixture may include cooling the mixture to a predetermined temperature, such as cooling the mixture to a temperature of about 150° C., or a temperature of about 120° C., or a temperature of about 100° C., or a temperature of about 80°

C., or a temperature of about 50° C. In other embodiments, the step 110 of cooling the mixture may including cooling the mixture to a temperature between about 50° C. and about 150° C., or between about 80° C. and about 120° C., or between about 90° C. and about 110° C., or to a temperature of about 100° C.

Figure 4:
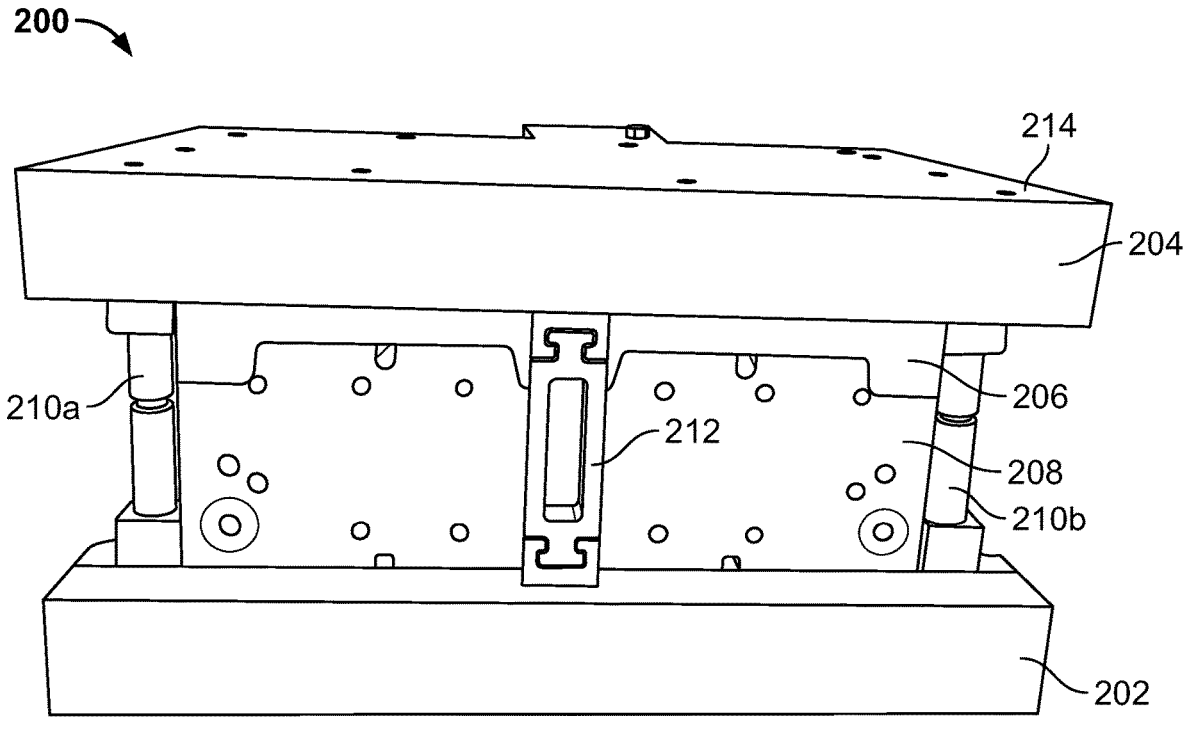
FIG. 4 illustrates a side view of a mold for producing an article of footwear that includes a top plate, a base plate, a top sidewall plate, and a base sidewall plate.

Next, referring to FIG. 4, a mold 200 for receiving the mixture of cork particles and binder material is shown. Further, aspects of the method 100 will be discussed in connection with the mold 200.

In general, sole assemblies and components of articles of footwear, such as a midsole for an article of footwear, are manufactured or formed using a mold 200 and the finished components (e.g., outsole or midsole) are required to be demolded and removed from the mold 200 prior to assembling into an article of footwear. In some embodiments of the method 100, the step 106 of transferring the mixture to the mold 200 further includes assembling the mold 200 before or after the mixture is received.

With particular reference to FIG. 4, the mold 200 may include a base plate 202 and a top plate 204. Further, the mold 200 may also include one or more sidewall plates, such as a top sidewall plate 206 and base sidewall plate 208. The sidewall plates 206, 208 may be configured as individual plates or plates linked to or formed with the base plate 202 and the top plate 206 (e.g., the base plate 202 is attached to the base sidewall plate 208 and the top plate 204 is attached to the top sidewall plate 208. The mold 200 may further include alignment posts 210a-d that assist in aligning the multiple plates of the mold 200, as well as a latch 212 that secures the multiple plates of the mold 200 together. Further, the mold 200 also may be defined by an overall external surface 214 over the entirety of the mold 200.

Figure 5:
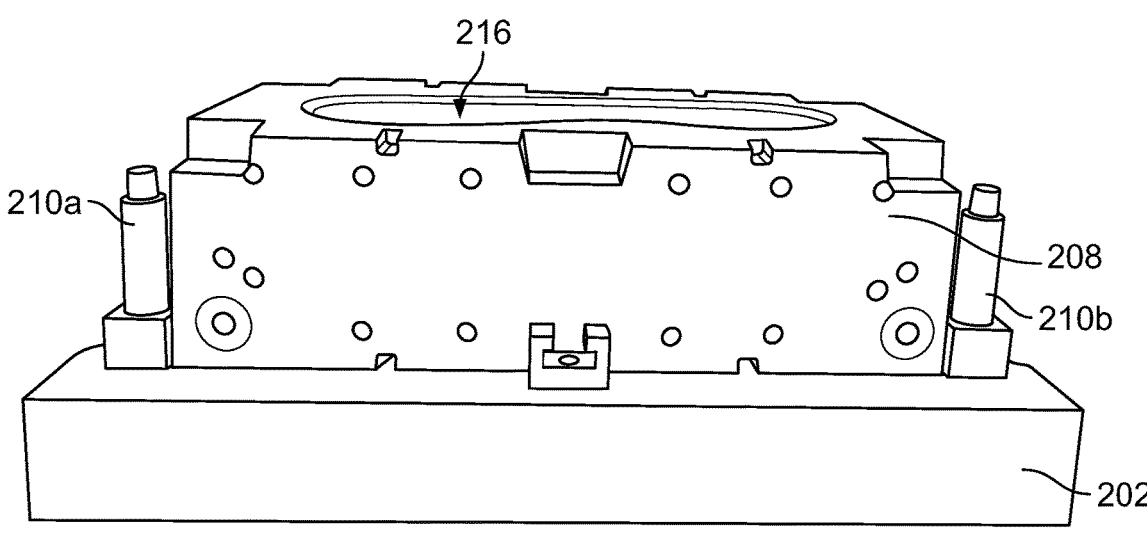
FIG. 5 illustrates a side view of the mold of FIG. 4 with the top plate and the top sidewall plate removed.

Now, with reference to FIG. 5, the mold 200 is shown with the latch 212 unlocked and the top plate 204 and the top sidewall plate 206 removed. Removal of the top plate 204 and the top sidewall plate 206 exposes a cavity 216 having the approximate shape of an article, which in this case is a midsole for an article of footwear. Further, during the molding process, the mold 200 may receive the mixture of the cork particles and binder material in the cavity 216. The mold 200 then holds the mixture in the shape of the cavity 216 while energy (e.g., heat or electromagnetic waves) is applied to activate the binding material and fuse the cork particles and binder material to form the cork composite material 10.

Figure 6:
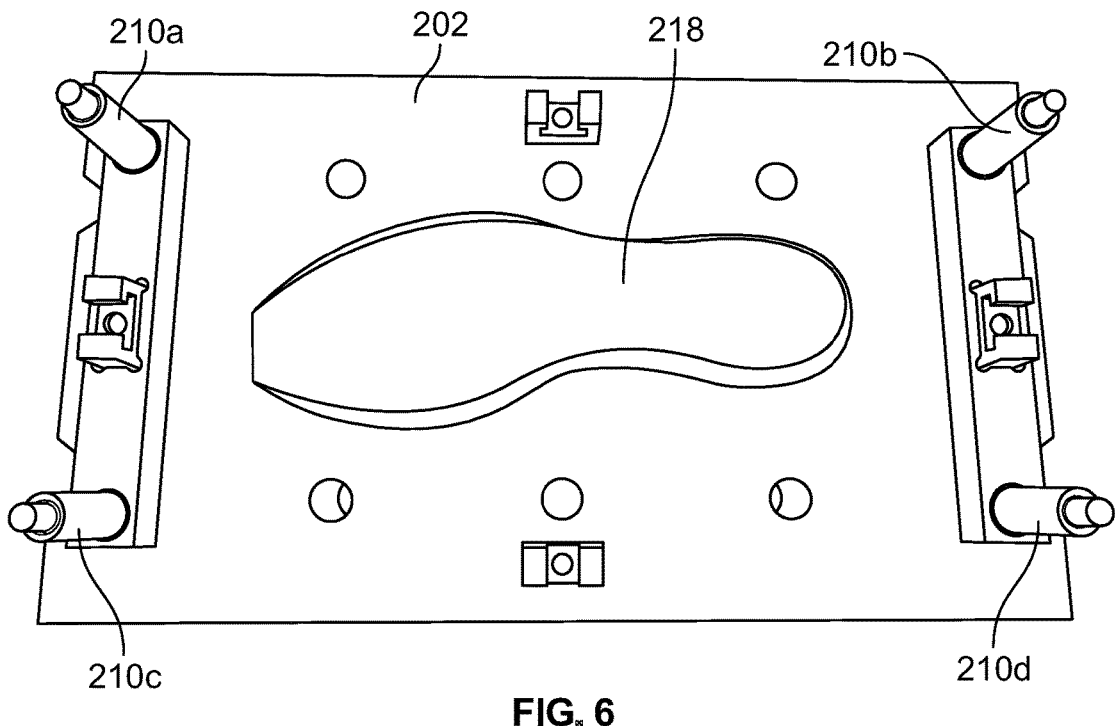
FIG. 6 illustrates a plan view of the mold of FIG. 4, where the top plate, the top sidewall plate, and the base sidewall plate are removed.

Next, FIG. 6 depicts the mold 200 with the top plate 204, top sidewall plates 206, and base sidewall plates 208 removed, thereby revealing the base plate 202. In some particular embodiments, the base plate 202 may include one or more projections, such as the projection 218, that form in the shape of a top surface of a midsole. Further, the top plate 204 and the base plate 202 may each include one or more cavities 216 or one or more projections 218, depending on the style and form of the midsole.

Figure 7:
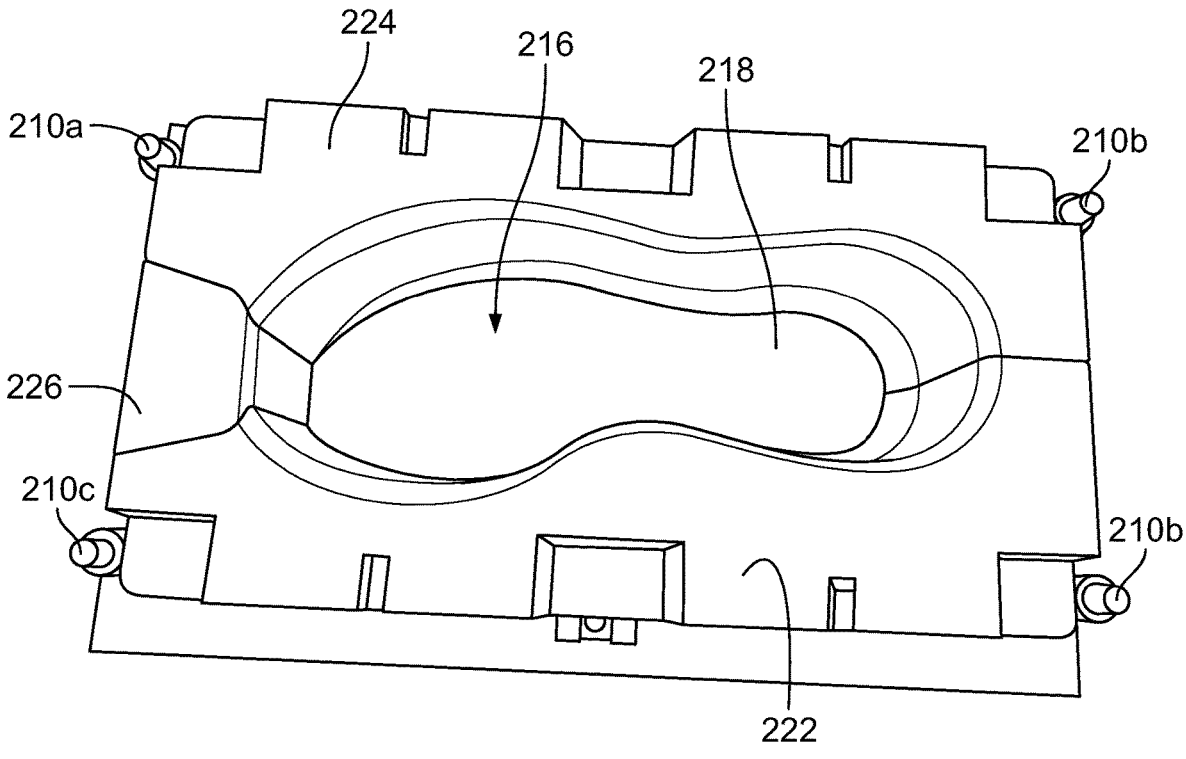
FIG. 7 illustrates a plan view of the mold of FIG. 4, where the top plate and the top sidewall plate are removed.
Figure 8:
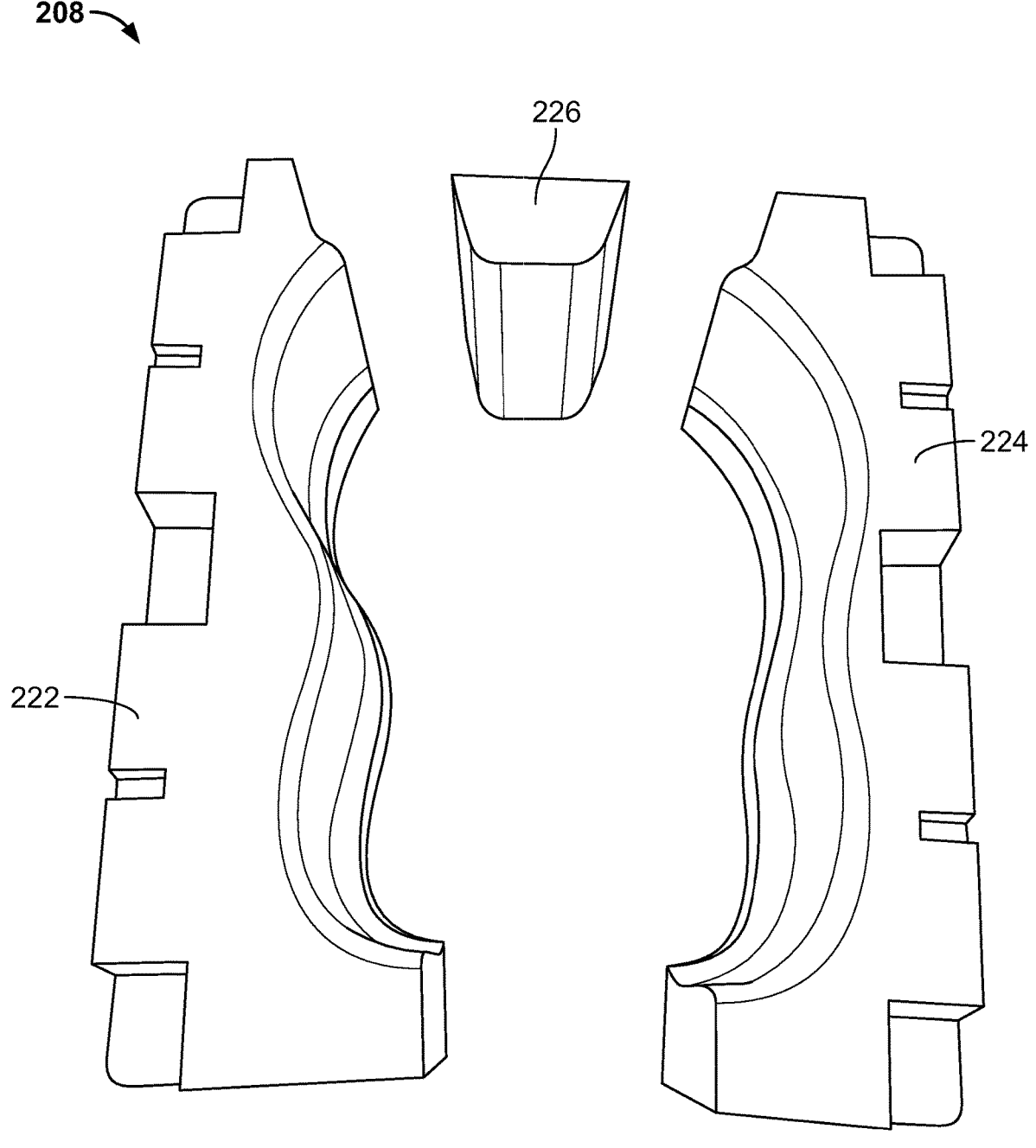
FIG. 8 illustrates an exploded view of the base sidewall plate.

FIG. 7 depicts the mold 200 with the top plate 204 and the top sidewall plate 204 removed, which leaves the base sidewall plate 208 and the base plate 204 visible (e.g., only the projections 218 of the base plate 202 are visible). In this view, a portion of the cavity 216 is clearly visible as defined by inner walls 220 of the base sidewall plate 208 and the projections 218 of the base plate 202. In some embodiments, one or more of the base sidewall plate 208 or the top sidewall plate 206 is divided into two or more portions. For example, and as shown in FIG. 8, the base sidewall plate 208 is divided into a medial base sidewall portion 222, a lateral base sidewall portion 224, and a toe base sidewall portion 226. The different portions may allow for easy dismantling of the mold 200 and removal of the molded article, e.g., a molded midsole. Further detail of the medial base sidewall portion 222, the lateral base sidewall portion 224, and the toe base sidewall portion 226 are shown as an exploded view of the base sidewall plate 208 in FIG. 8.

In some embodiments, the mold 200 is used for forming a portion of a midsole and the molded midsole portion is merged with one or more other midsole portions to form the midsole. For example, the base sidewall plate 208 or the base sidewall portions 222, 224, 226 may have specific cavity or projection sections omitted due to the complexity of the design. The toe sidewall portion 226, for example, may have a blunted appearance configured to form a lip or toe portion of the midsole, or the lip or toe portion of the midsole may be formed separately and attached later in the fabrication process.

Figure 9:
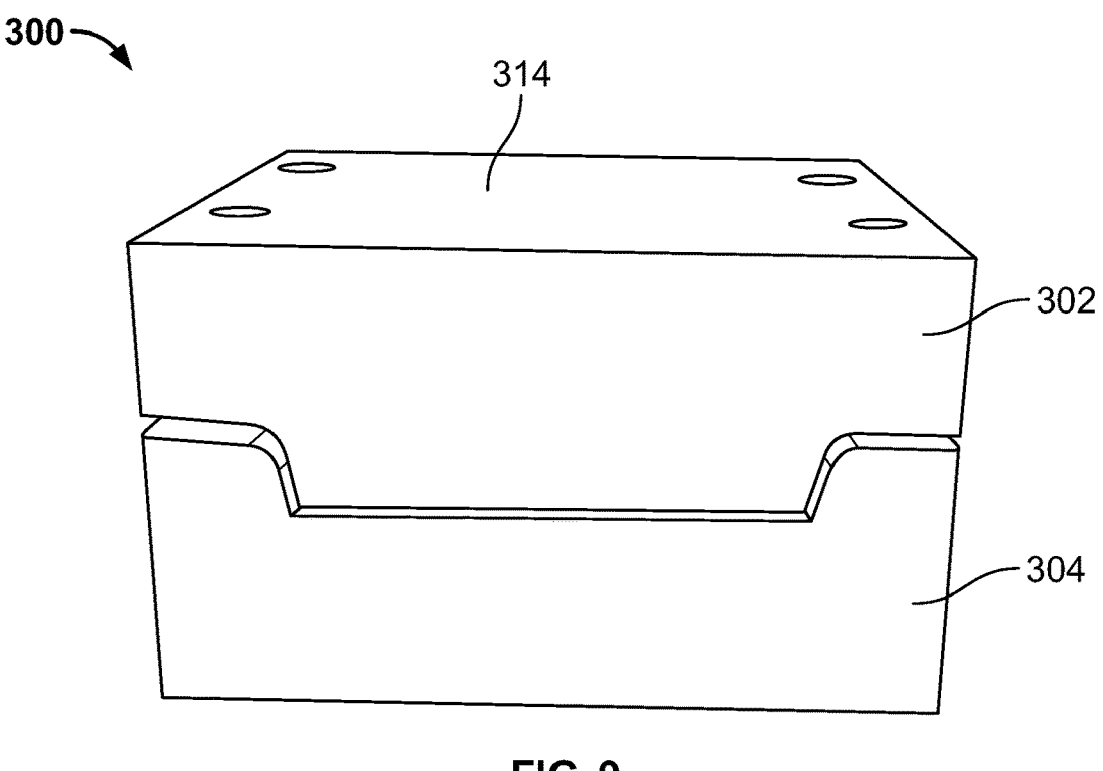
FIG. 9 illustrates a side view of another mold, according to a second aspect of the present disclosure.
Figure 10:
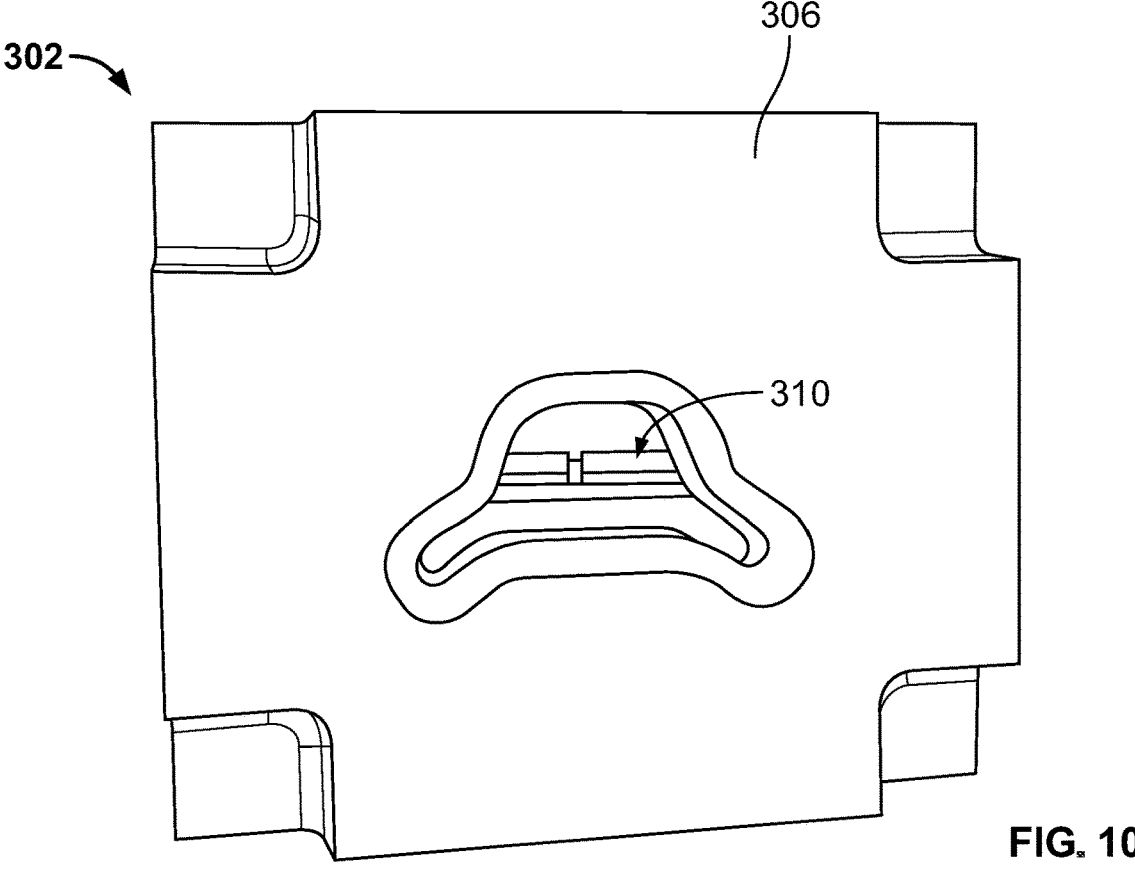
FIG. 10 illustrates an interior surface of a top plate of the mold of FIG. 9.
Figure 11:
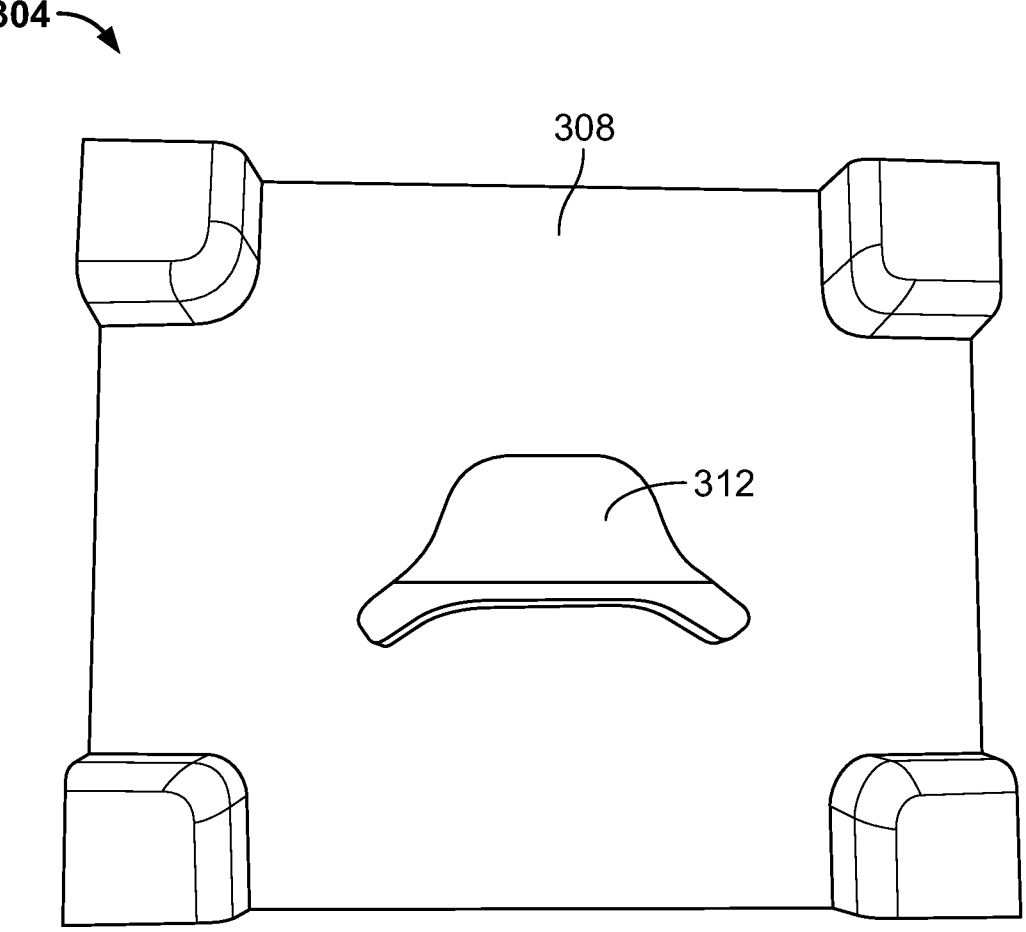
FIG. 11 illustrates an interior surface of the base plate of the mold of FIG. 9.

Now, referring to FIG. 9, a mold 300 for forming a toe portion of a midsole is shown. Here, the mold 300 may include one or more, or all of the components of the mold 300. The mold 300 may include a top plate 302 and a base plate 304, which fit together as a sandwich structure. Additionally, when the mold 300 is taken apart, interior surfaces 306, 308 of the top plate 302 and the base plate 304 reveal a cavity 310 and a projection 312, as shown in FIGS. 10 and 11. Further, as described herein, the mixture of cork particles and binding material may be added to the cavity 310 of the mold 300, the top plate 302 and the base plate 304 may then be sandwiched together, and then after heat or energy may be applied to the mold 300 to activate the binding material and fuse the cork composite material 10.

Figure 12:
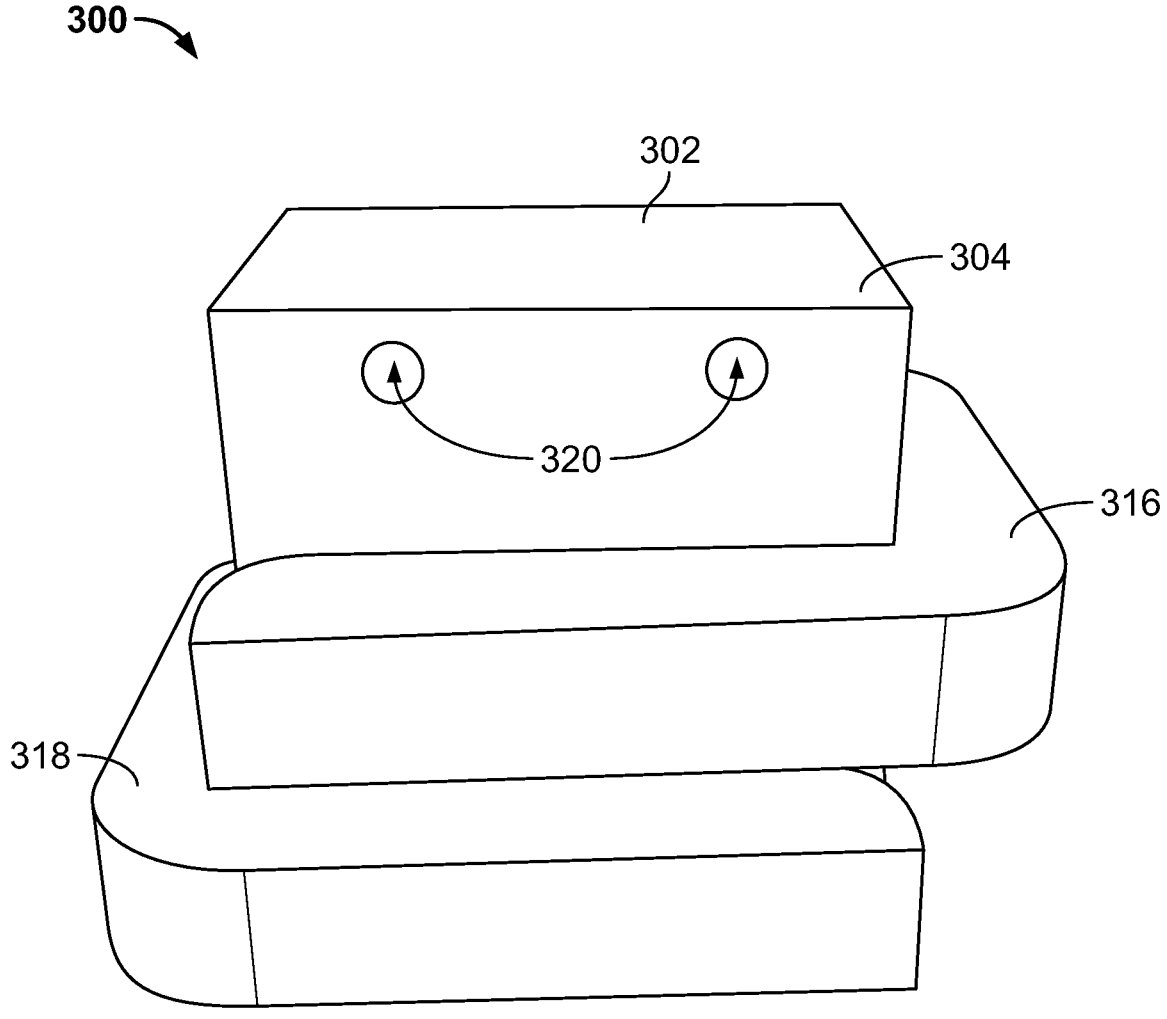
FIG. 12 illustrates a mold secured with clamps.

Referring to FIG. 12, the mold 300 may also include one or more clamps 316, 318, which secure the top plate 302 and the base plate 304 to each other during the molding process. The clamps 316, 318 may be of any type, including but not limited to, an interference fit clamp (e.g., as shown in FIG. 12), a spring clamp, a miter clamp, and a screw clamp. The clamps 316, 318 may also be made of any material, including but not limited to plastic or metal. In some embodiments, the mold 300 is secured via a latch and/or alignment posts, as discussed in connection with mold 200. In other embodiments, the mold 300 may include one or more clamps 316, 318.

As discussed previously for the method 100, the transfer of the mixture of cork particles and binder material to the molds 200, 300 may be accomplished by pouring or injecting the mixture into the mold. For example, the mixture may be poured into the portion of the mold 200, 300 that includes the cavities 216, 310 and the molds 200, 300 may be closed. In another example, the molds 200, 300 may include a port and the mixture may be injected into the assembled molds 200, 300. In these embodiments, the molds 200, 300 may include one or more ports 320. As discussed, in some embodiments, the ports 320 may be injection ports used for injecting the mixture into the mold 200, 300. For instance, in some embodiments, the ports 320 may be connected to injection channels (not shown) that lead to the cavities 216, 310. In some embodiments, the one or more ports 320 may also be cooling ports used for injection of a coolant (e.g., air or liquid coolants) to cool down the mold 200, 300 and the mixture therein. For example, in some embodiments, the ports 320 may be connected to cooling channels that circulate through the molds 200, 300. The ports 320 may also include both input and output ports. In this embodiment, a channel is formed in at least one of the top plate 204, 302; the base plate 202, 304; the top sidewall plate 206; and/or the base sidewall plate 208.

In other embodiment, the molds 200, 300 may be cooled via air or liquid flowing through channels alongside or within the mold (e.g., the channels directing the flow of air or liquid). For example, the air or liquid may be injected or otherwise flow through one or more ports 320 of the molds 200, 300 that are connected to channels within the molds 200, 300 more rapidly than cooling methods relying on cooling only the exterior surfaces 214, 314 of the molds 200, 300.

In further embodiments, the method 100 includes a step 110 of removing the cork composite material 10, such as a midsole or other component of an article of footwear, from the molds 200, 300. For example, once the molds 200, 300 are cooled, the latch 212 or the clamps 316, 318 may be removed or unlatched and the components of the molds 200, 300 may be disassembled. Then, the finished produce may be removed from the cavities 216, 310.

In some embodiments, the method 100 does not include the use of external pressure upon the molds 200, 300. In traditional molding processes where steel or aluminum molds are used, the mixture is poured and closing the top plate of the mold creates an internal pressure. The mold is inserted into a heat compression mold machine wherein heat is applied for several minutes while simultaneously applying pressure. After heating, the mold is transferred to a cooling station where water is poured over the mold for some time to cool the mold and lower the internal temperature before the molded part is removed. The high pressures used in the traditional methods often cause unwanted increased density in the molded product, such as in cork composite material. High pressures can also affect the efficiency of bonding between the cork particles and the binding material, resulting in cork particles that are not well bonded. The reduced bonding can result in a product that is less stable and may feel less smooth to the touch. In the method of the current disclosure, external pressure is not used, resulting in a product of correct lower density while ensuring homogeneous curing.

Although no external pressure is placed upon the external surface 214, 314 of the molds 200, 300, pressure may be added to the mixture or cork composite material 10 during assembly of the mold (e.g., when the top plate 204, 302 is placed on the base plate 202, 304). Additionally, heating the molds 200, 300 may also cause the mixture to expand against the inner walls 220 or interior surface 306, 308, which may cause an increase in pressure within the molds 200, 300. However, no additional external pressure is added to molds 200, 300 after assembly, e.g., no external pressure is applied to the molds 200, 300 between transferring the mixture to the molds 200, 300 and/or assembling the molds 200, 300 until the cork composite material is removed from the molds 200, 300. For example, in some embodiments, no external pressure is applied to the molds 200, 300 while the molds 200, 300 are assembled with the mixture and while the mixture is being heated or fused.

According to another aspect of the present disclosure a midsole or article of footwear including the cork composite material 10 is disclosed. Here, the midsole or article of footwear may include the midsole or any variant of the midsole, as described herein. The midsole may also be constructed of a single component or layer, or multiple components of layers.

Referring now to FIGS. 13-16, an article of footwear 400 having a cork composite material of the present disclosure is shown. In particular, FIGS. 13-16 depict an exemplary embodiment of an article of footwear 400 that may include the composite cork material 10, or individual components thereof. In this embodiment, the article of footwear 400 includes a sole structure 402 and an upper 404, which may be attached to the sole structure 402 and together may define an interior cavity 406 into which a foot may be inserted.

Figure 14:
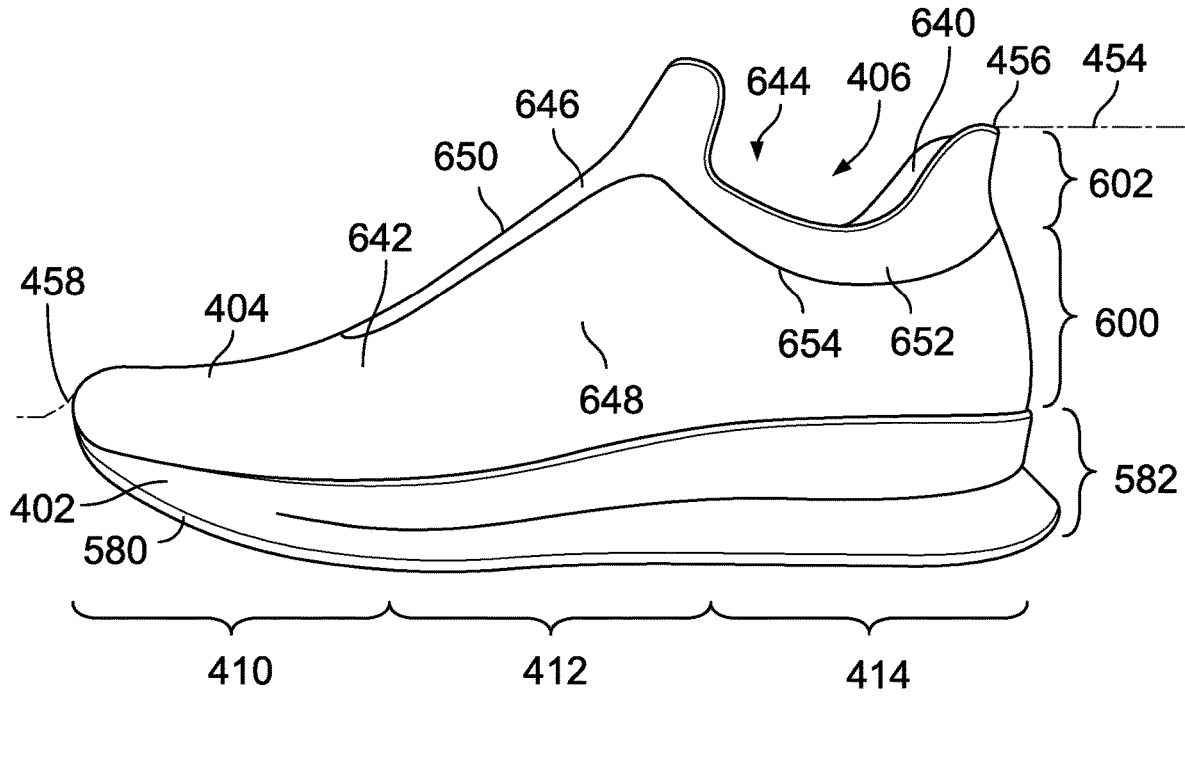
FIG. 14 is a lateral side elevational of the article of footwear of FIG. 13.
Figures 15, 16:
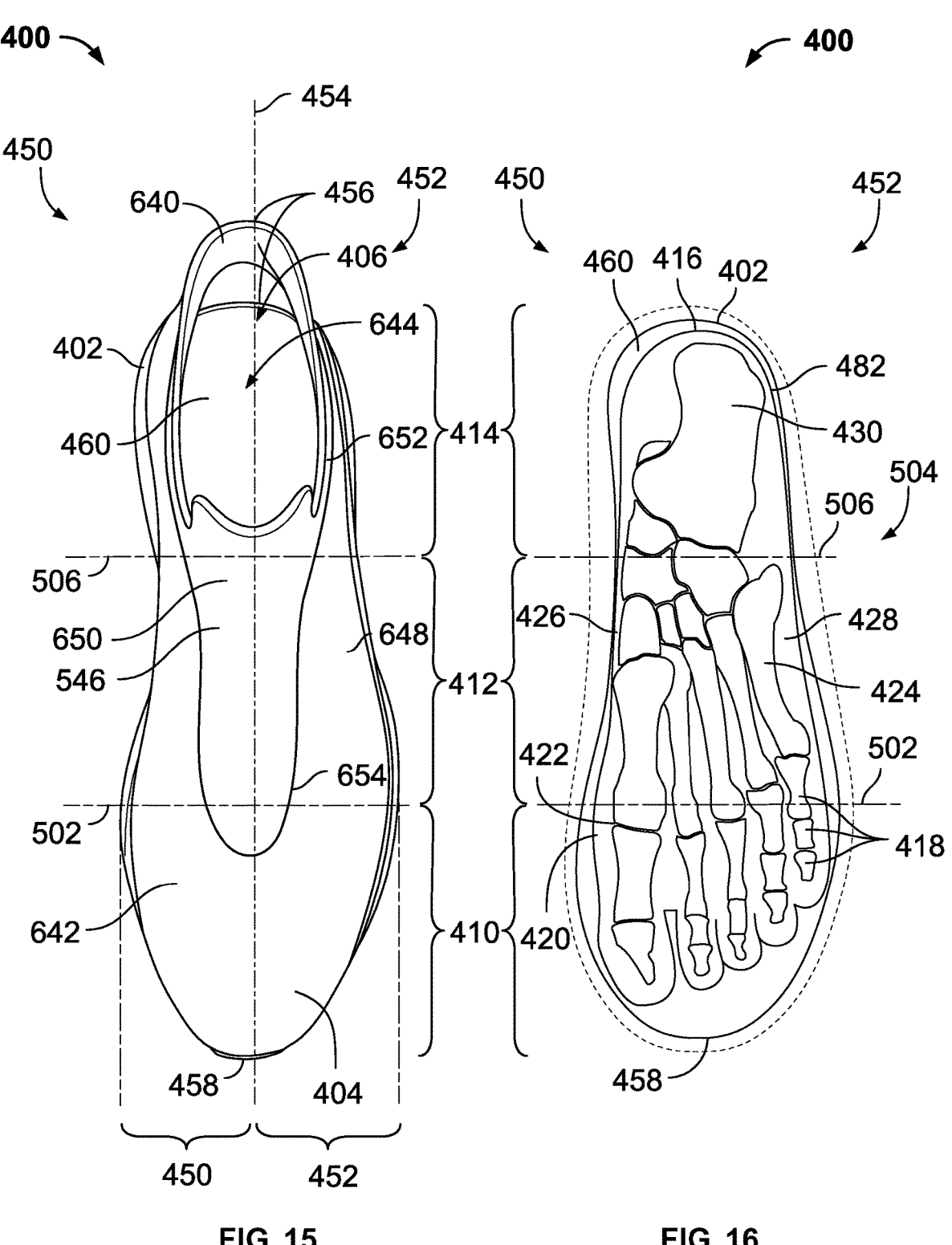
FIG. 15 is a top plan view of the article of footwear of FIG. 13.
FIG. 16 is a top plan view of the article of footwear of FIG. 13, with an upper removed and a user's skeletal foot structure overlaid thereon.

In order to provide points of reference and specifically referring to FIGS. 15 and 16, the article of footwear 400 may be defined by a forefoot region 410, a midfoot region 412, and a heel region 414 (see FIGS. 14-16). Referring to FIGS. 15 and 16, the forefoot region 410 may generally correspond with portions of the article of footwear 400 that encase portions of a foot 416 that include the toes or phalanges 418, the ball of the foot 420, and joints 422 that connect the metatarsals 424 of the foot 416 with the toes or phalanges 418. The midfoot region 412 is proximate to the forefoot region 410 and adjoins the forefoot region 410. The midfoot region 412 generally corresponds with portions of the article of footwear 400 that encase the arch of a foot 416, along with the bridge 428 of the foot 416. The heel region 414 is proximate to the midfoot region 412 and adjoins the midfoot region 412. The heel region 414 generally corresponds with portions of the article of footwear 400 that encase rear portions of the foot 416, including the heel or calcaneus bone 430, the ankle 432, and/or the Achilles tendon (not shown).

Referring back to FIGS. 13-16, the article of footwear 400 also includes a medial side 450 and a lateral side 452. In particular, the lateral side 452 corresponds to an outside portion of the article of footwear 400 and the medial side 450 corresponds to an inside portion of the article of footwear 400. As such, a left article of footwear and a right article of footwear have opposing lateral and medial sides, such that the medial sides 450 are closest to one another when a user is wearing the articles of footwear 400, while the lateral sides 452 are defined as the sides that are farthest from one another while being worn. As will be discussed in greater detail below, the medial side 450 and the lateral side 452 adjoin one another along a longitudinal central plane or axis 454 of the article of footwear 400. As will be further discussed herein, the longitudinal central plane or axis 454 may demarcate a central intermediate axis between the medial side 450 and the lateral side 452 of the article of footwear 400. Put differently, the longitudinal plane or axis 454 may extend between a rear, distal end 456 of the article of footwear 400 and a front, distal end 458 of the article of footwear 400 and may continuously define a middle of an insole 460, the sole structure 402, and/or the upper 404 of the article of footwear 400, i.e., the longitudinal plane or axis 454 is a straight axis extending through the rear, distal end 456 of the heel region 414 and to the front, distal end 458 of the forefoot region 410.

Certain aspects of the disclosure may refer to portions or elements that are coextensive with one or more of the forefoot region 410, the midfoot region 412, the heel region 414, the medial side 450, and/or the lateral side 452. Further, both the upper 404 and the sole structure 402 may be characterized as having portions within the forefoot region 410, the midfoot region 412, the heel region 414, and on the medial side 450 and the lateral side 452. Therefore, the upper 404 and the sole structure 402, and/or individual portions of the upper 404 and the sole structure 402, may include portions thereof that are disposed within the forefoot region 410, the midfoot region 412, the heel region 414, and on the medial side 450 and the lateral side 452.

Unless otherwise specified herein, and specifically referring to the top plan view of FIGS. 15 and 16, the forefoot region 410, the midfoot region 412, the heel region 414, the medial side 450, and the lateral side 452 are intended to define boundaries or areas of the article of footwear 400. To that end, although the forefoot region 410, midfoot region 412, heel region 414, medial side 450, and lateral side 452 have been generally defined above, it should be understood that the forefoot region 410, the midfoot region 412, the heel region 410, the medial side 450, and the lateral side 452 may also be characterized as exact sections of the article of footwear 400, in particular embodiments. As such, particular reference to the forefoot region 410, the midfoot region 412, the heel region 414, the medial side 450, and/or the lateral side 452 may be defined in both general terms to provide reference to particular portions of the article of footwear and exact terms to provide discrete boundaries across an article of footwear, such as the article of footwear 400.

For example, it should be understood that numerous modifications may be apparent to those skilled in the art in view of the foregoing description and the composite material 100, and individual components thereof, may be incorporated into numerous articles of footwear. Accordingly, aspects of the article of footwear 400 and components thereof (e.g., the composite material 100 incorporated therein), may be described with reference to general areas or portions of the article of footwear 400, with an understanding the boundaries of the forefoot region 410, the midfoot region 412, the heel region 414, the medial side 418, and/or the lateral side 452 as described herein may vary between articles of footwear.

However, aspects of the article of footwear 400 and individual components thereof, may also be described with reference to exact areas or portions of the article of footwear 400 and the scope of the appended claims herein may incorporate the limitations associated with these boundaries of the forefoot region 410, the midfoot region 412, the heel region 414, the medial side 450, and/or the lateral side 452 discussed herein.

In light of the above, and with continued reference to the top plan view of FIGS. 15 and 16, the forefoot region 410, the midfoot region 412, the heel region 414, the medial side 450, and the lateral side 452 are shown in greater detail. The forefoot region 410 extends from a toe end or front distal end 458 to a widest portion 500 of a forefoot region 410 of the article of footwear 400. In particular aspects, the forefoot region 410 may extend from a toe end or front distal end 458 to a widest portion of an insole 460, a sole structure 402, and/or an upper 404 of the article of footwear 400. The widest portion 500 may be defined or measured along a line 502 that is perpendicular with respect to the longitudinal, central axis 454 that extends from a front distal end 458 of the forefoot region 410 to a rear distal end 456 of the heel region 414 of the article of footwear 400, which is opposite the front distal end 458 of the forefoot region 410. The widest portion 500 of the article of footwear 400 may also be generally defined by the portion of the article of footwear 400 that encases the portion of the foot 416 at which point a proximal phalanx, or proximal phalange 418, connects to the metatarsal 424 of the foot 416.

The midfoot region 412 extends from the widest portion 500 to a thinnest portion 504 of the article of footwear 400. The thinnest portion 504 of the article of footwear 400 is defined as the thinnest portion of the insole 460, the sole structure 402, and/or the upper 404 of the article of footwear 400, measured across a line 506 that is perpendicular with respect to the longitudinal, central axis 454. The heel region 414 of the article of footwear 400 extends from the thinnest portion 504 of the insole 460, the sole structure 402, and/or the upper 404 of the article of footwear 400 and to the rear distal end 456 of the article of footwear 400.

Still referring to FIGS. 15 and 16, the medial side 450 begins at the rear distal end 456 and bows outward along an inner side of the article of footwear 400 along the heel region 414 toward the midfoot region 412. The medial side 450 reaches a widest heel portion 550 at which point the medial side 450 bows inward, toward the central, longitudinal axis 456. The medial side 450 extends from the widest heel portion 550 and toward the thinnest portion 504, at which point the medial side 450 enters into the midfoot region 412 (i.e., upon crossing the line 506). From the thinnest portion 504, the medial side 450 bows outward, away from the longitudinal, central axis 454 and toward the widest portion 500, at which point the medial side 450 extends into the forefoot region 410 (i.e., upon crossing the line 502). Once at the widest portion 500, the medial side 450 bows inward toward the front distal end 458, and terminates at a point where the medial side 450 meets the longitudinal, center axis 454.

Continuing to refer to FIGS. 15 and 16, the lateral side 452 also begins at the rear distal end 456 of the heel region 414 and bows outward along an outer side of the article of footwear 400 along the heel region 414 toward the midfoot region 412. The lateral side 452 reaches the widest heel portion 550, at which point the lateral side 452 bows inward, toward the longitudinal, central axis 456. The lateral side 452 extends from the widest heel portion 550 and toward the thinnest portion 504, at which point the lateral side 452 enters into the midfoot region 412 (i.e., upon crossing the line 506). From the thinnest portion 504, the lateral side 452 bows outward, away from the longitudinal, central axis 454 toward the widest portion 500, at which point the lateral side 452 extends into the forefoot region 410 (i.e., upon crossing the line 502). Once at the widest portion 500, the lateral side 452 bows inward toward the front distal end 458, and terminates at a point where the lateral side 458 meets the longitudinal, center axis 456.

Referring back to FIGS. 13-16, the sole structure 402 is connected or secured to the upper 404 and extends between a foot of a user and the ground when the article of footwear 400 is worn by the user. The sole structure 402 may also include one or more components, which may include an outsole, a midsole, a heel, a vamp, and/or an insole. For example, in some embodiments, a sole structure may include an outsole that provides structural integrity to the sole structure, along with providing traction for a user, a midsole that provides a cushioning system, and an insole that provides support for an arch of a user.

Still referencing FIGS. 13-16, the sole structure 402 of the present embodiment may be characterized by an outsole region 580, a midsole region 582, and an insole or insole region 460 (see FIG. 15). The outsole region 580, the midsole region 582, and the insole region 460, and/or any components thereof, may include portions within the forefoot region 410, the midfoot region 412, and/or the heel region 414. Further, the outsole region 580, the midsole region 582, and the insole region 460, and/or any components thereof, may include portions on the lateral side 452 and/or the medial side 450. The outsole region 580, the midsole region 582, and the insole region 460 are not intended to define precise or exact areas of the sole structure 402. Rather, the outsole region 480, the midsole region 582, and the insole region 460 are generally defined herein to aid in discussion of the sole structure 402 and components thereof.

In other instances, the outsole region 580 may be defined as a portion of the sole structure 402 that at least partially contacts an exterior surface (e.g., the ground), when the article of footwear 400 is worn, the insole region 460 may be defined as a portion of the sole structure 402 that at least partially contacts a user's foot when the article of footwear is worn, and the midsole region 582 may be defined as at least a portion of the sole structure 402 that extends between and connects the outsole region 480 with the insole region 460.

Figure 13:
FIG. 13 is a perspective view of an article of footwear incorporating the cork composite material of FIG. 1.
Figure 13:
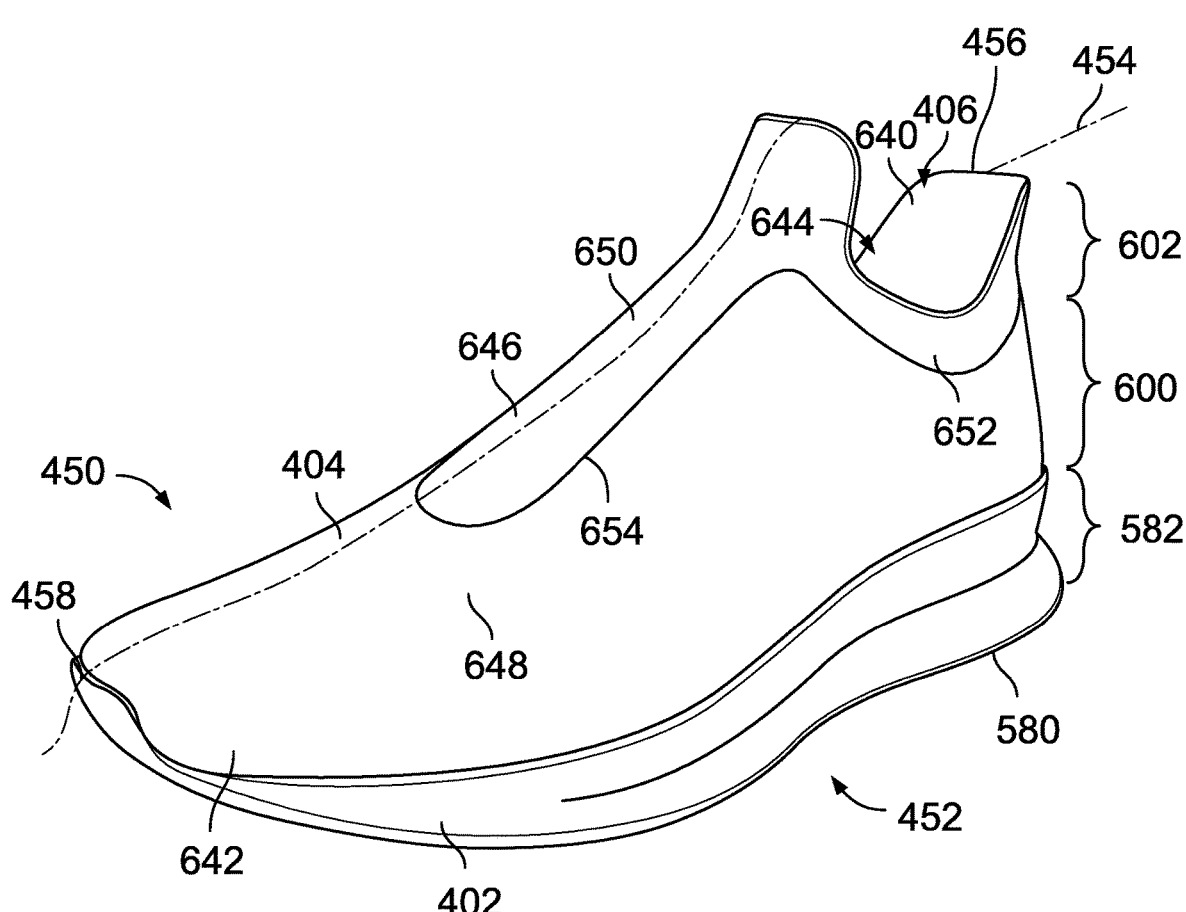

The upper 404, as shown in FIGS. 13-16, extends upwardly from the sole structure 402 and defines the interior cavity 406 that receives and secures a foot of a user. The upper 404 may be defined by a foot region 600 and an ankle region 602, as shown in FIGS. 13 and 14. In general, the foot region 600 extends upwardly from the sole structure 402 and through the forefoot region 410, the midfoot region 412, and the heel region 414. The ankle region 602 is primarily located in the heel region 616; however, in some embodiments, the ankle region 602 may partially extend into the midfoot region 614.

The article of footwear 400 may also have a lacing system (not shown) that includes a lace, a plurality of apertures, and a plurality of bands or lacing straps (not shown).

With continued reference to FIGS. 13-16, the upper 404 may extend along the lateral side 452 and the medial side 450, and may extend across the forefoot region 410, the midfoot region 412, and the heel region 414 to house, enclose, or encase a foot of a user. The upper 404 may also include an apex, which in some embodiments, is the longitudinal, central axis 454 that defines the boundary between the lateral side 452 and the medial side 452 of the upper 404. In instances where the longitudinal, central axis 454 defines the apex of the upper 404, the lateral side 452 of the upper 404 may be the outside portion of the upper 404 that extends from the apex and the medial side 450 of the upper may be the inside portion of the upper 404 that extends from the apex.

In this particular embodiment, the upper 404 also includes an interior surface 640 and an exterior surface 642. The interior surface 640 faces inward and generally defines the interior space 406, and the exterior surface 642 of the upper 404 faces outward and generally defines an outer perimeter of the upper 404. The upper 404 also includes an opening 644 that is at least partially located in the heel region 414 of the article of footwear 400, that provides access to the interior space 460 and through which a foot may be inserted and removed. In some embodiments, the upper 404 may also include an instep area 646 that extends from the opening 644 in the heel region 414 over an area corresponding to an instep of a foot to an area adjacent the forefoot region 410.

In the embodiment shown in FIG. 14, the upper 404 comprises an outer layer 648, an instep layer 650, and a collar layer 652. More particularly, the outer layer 648 extends upwardly from the sole structure 402 along the forefoot region 410, the midfoot region 412, and the heel region 414 to a boundary 654. In this embodiment, the boundary 654 defines a transition point, at which point, the upper 404 transitions from the outer layer 648 to the instep layer 650 and/or the upper 604 transitions from the outer layer 648 to the collar layer 652. More particularly, the boundary 654 defines a portion of the upper 404 where the instep layer 650 begins to extend upward from the outer layer 648, or defines a portion of the upper 404 where the collar layer 652 begins to extend upward from the outer layer 648. In some embodiments, the instep layer 650 and the collar layer 652 may be both generally referred to as a second layer 650, 652.

The boundary 654 may extend around a periphery of the upper 404; through each of the forefoot region 410, the midfoot region 412, and the heel region 414; and/or across the medial side 450 and the lateral side 452 of the article of footwear 400. Therefore, portions of the instep layer 650 may be within the forefoot region 410, the midfoot region 412, and the heel region 414, and along the medial side 452 and/or the lateral side 454. Further, portions of the collar layer 652 may be within the heel region 414 and/or partially within the midfoot region 412.

In the particular embodiment shown in FIGS. 13-16, the instep layer 650 extends from the forefoot region 410 and through the midfoot region 412, and the collar layer 652 is located in the ankle region of the heel region 414. In other embodiments, the instep layer 650 may extend partially or fully into and through the forefoot region 410, and/or partially or fully into and through the heel region 414. Further, in some embodiments, the collar layer 652 may extend at least partially into the midfoot region 412.

As discussed hereinafter, in some embodiments, the boundary 654 may define a portion of the upper 404 where the properties associated with the instep layer 650 and/or the collar layer 652, e.g., a stitch type, a yarn type, or characteristics associated with different stitch types or yarn types, such as elasticity, aesthetic appearance, thickness, air permeability, or scuff-resistance, may be varied from the outer layer 648 or other portions of the upper 404. For example, the upper 404, and the individual components thereof (e.g., the outer layer 648, the instep layer 650, and the collar layer 652) may be individually formed using a variety of elements, textiles, polymers (including foam polymers and polymer sheets), leather, synthetic leather, etc. Further, the upper 404, and the individual components thereof, may be joined together through bonding, stitching, or by a seam to create the upper 404.

In one aspect, as will be further discussed herein, the upper 404 of the article of footwear 400 may be formed from one or more knitted structures or knitted components. In such aspects, the knitted components may include various types of yarn, or other textile materials, that may provide a variety of different properties to the upper 404. For example, one area of the upper 404 may be formed or constructed from a first type of yarn or material that imparts or instills a first set of properties, and another area of the upper 404 may be formed from a second type of yarn or material that imparts or instills a second set of properties. As such, particular portions of the upper 404 may include a variety of distinct properties.

In the particular embodiment shown in FIGS. 13-16, the outer layer 648 is a uniform structure that continuously circumscribes an entire upper perimeter of the sole structure 402. However, in other embodiments, the outer layer 648 may include a plurality of sections, such as a forefoot outer layer, a midfoot outer layer, and/or a heel outer layer that may be connected to form the outer layer 648. For example, in these embodiments, the forefoot outer layer, the midfoot outer layer, and the heel outer layer may be connected by one or more seams to form the outer layer 648.

Figure 17:
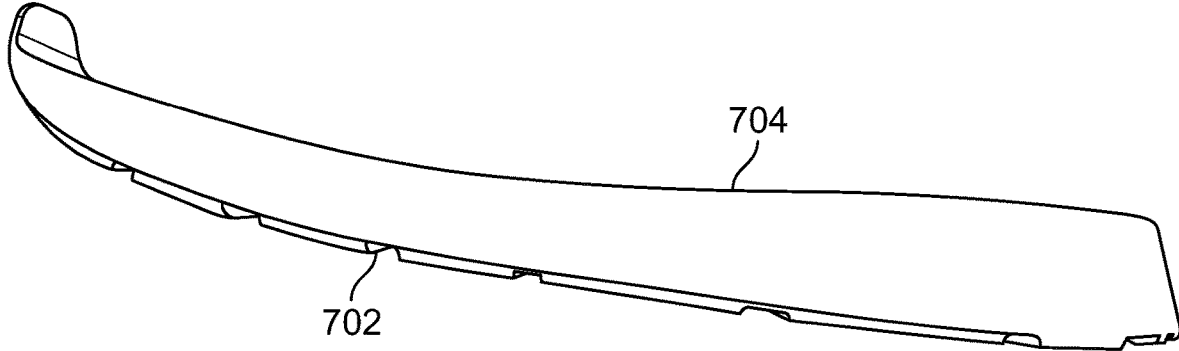
FIG. 17 is a side elevational view of a midsole manufactured using the method of FIG. 3.
Figure 18:
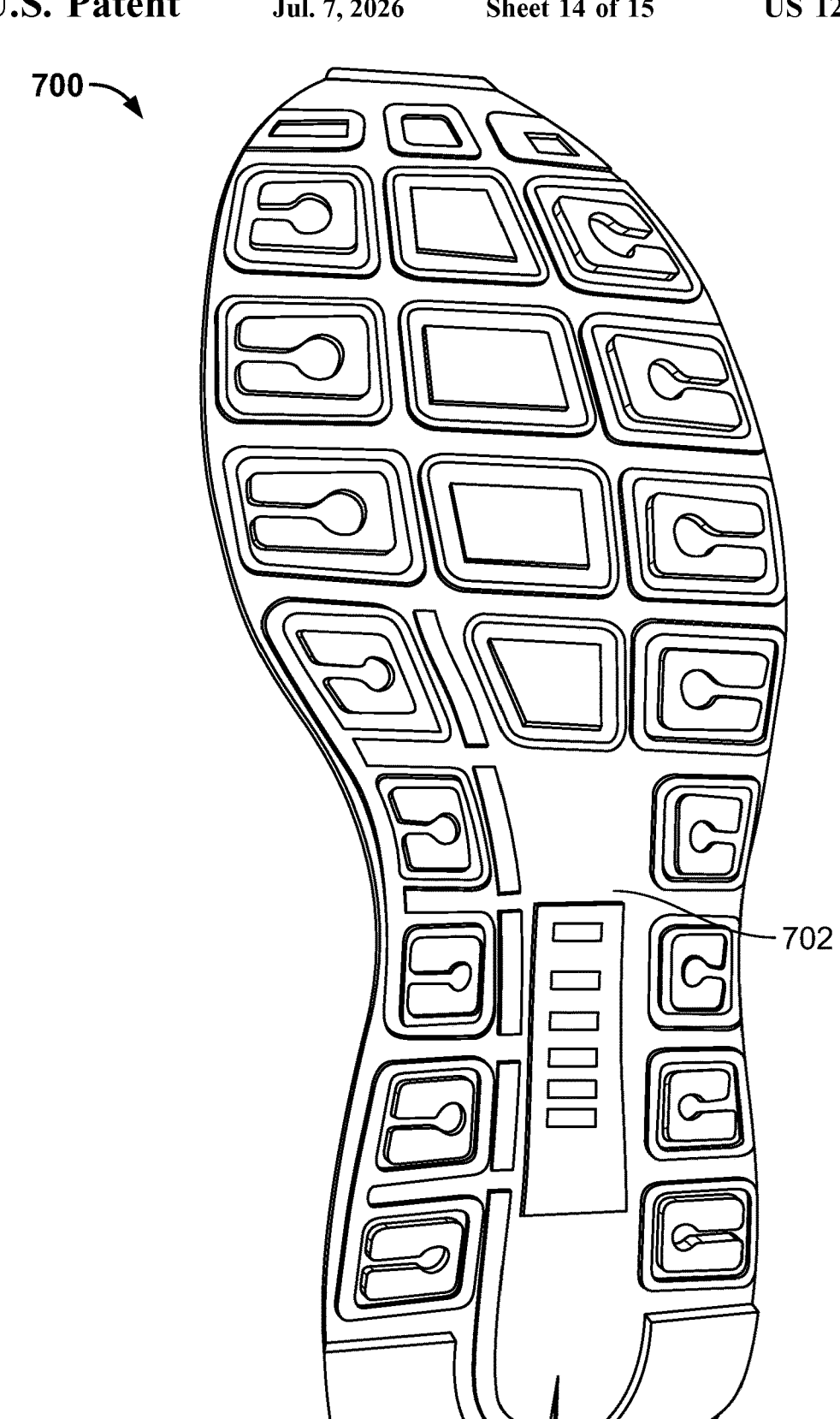
FIG. 18 is a bottom view of the midsole of FIG. 17.
Figure 19:
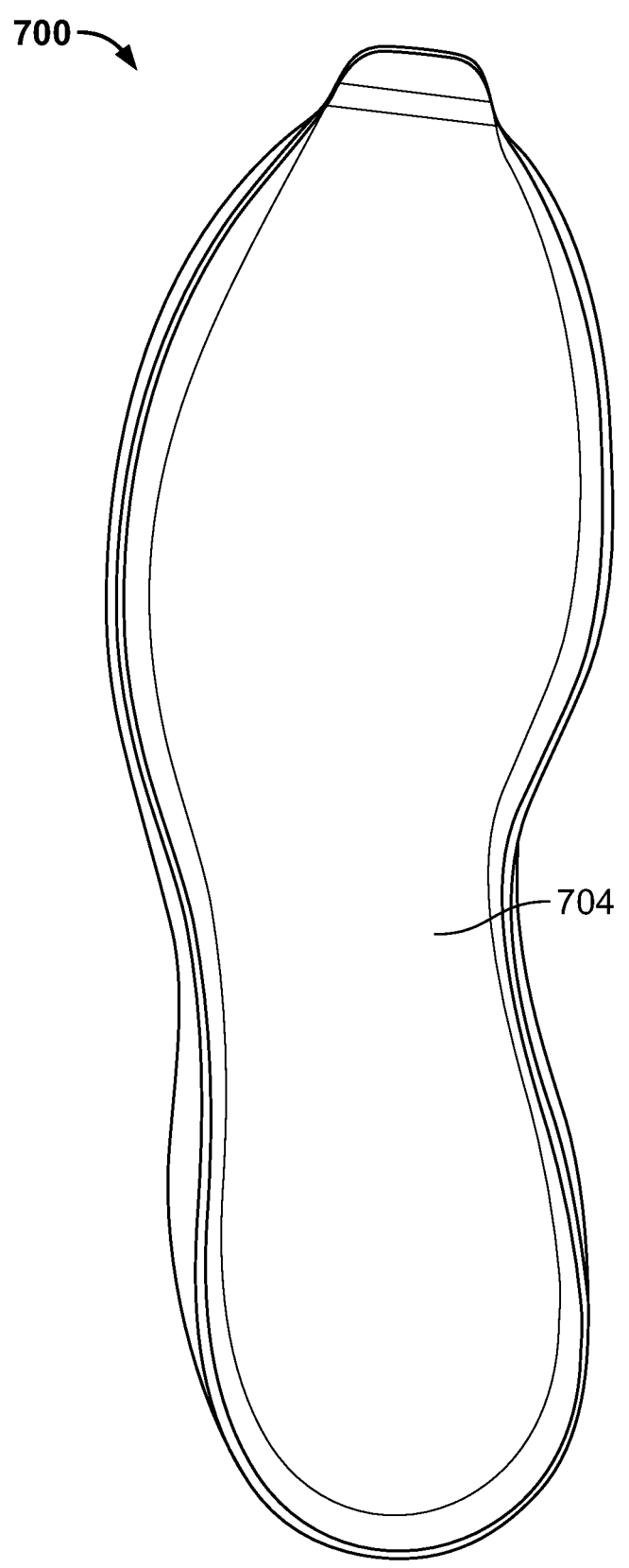
FIG. 19 is a top view of the midsole of FIG. 17.

Referring now to FIGS. 17-19, a sole structure 700 that may be used for the sole structure 402 is shown. Further, as shown in FIGS. 17-19, the sole structure is a unitary structure composed of the cork composite material 10. Additionally, the midsole 700 includes a bottom surface 702 and a top surface 704.

Although the description below is in connection with an article of footwear, it would be understood that the methodology discussed herein may be used to produce other articles.

Any of the embodiments described herein may be modified to include any of the structures or methodologies disclosed in connection with different embodiments. Further, the present disclosure is not limited to articles of footwear of the type specifically shown. Still further, aspects of the articles of footwear of any of the embodiments disclosed herein may be modified to work with any type of footwear, apparel, or other athletic equipment.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention. The exclusive rights to all modifications which come within the scope of the appended claims are reserved.

I claim:

1. A method of fabricating a cork composite material, comprising:
   providing a plurality of cork particles;
   adding a binder material to the plurality of cork particles to form a mixture of the plurality of cork particles and the binder material;
   transferring the mixture to a mold;
   applying energy to the mixture, wherein the energy includes electromagnetic radiation that fuses the plurality of cork particles with the binder material, wherein the energy comprises microwave radiation being supplied at a power between about 6 kW and about 18 kW;
   cooling the mixture, wherein cooling the mixture solidifies the mixture, forming a cork composite material; and
   removing the cork composite material from the mold.

2. The method of claim 1, wherein the energy heats the mixture to a fusion temperature, wherein the fusion temperature is between about 130° C. and about 160° C.

3. The method of claim 1, wherein the electromagnetic radiation is applied using a microwave.

4. The method of claim 1, wherein the energy is applied for less than 30 seconds.

5. The method of claim 1, wherein cooling the mixture comprises contacting the mold with a liquid.

6. The method of claim 5, wherein the mold comprises channels, wherein the channels are configured to direct a flow of the liquid.

7. The method of claim 1, wherein after transferring the mixture to the mold, and before removing the cork composite material from the mold, no external pressure is applied to at least one of the mixture, the mold, or the cork composite material.

8. The method of claim 1, wherein after transferring the mixture to the mold, and before removing the cork composite material from the mold, no external pressure is applied to the mixture, the mold, and the cork composite material.

9. The method of claim 1, wherein after transferring the mixture to the mold no external pressure is applied to the mold.

10. A component of an article of footwear prepared by the method of claim 1.

11. A method of fabricating a midsole of an article of footwear containing cork composite material, comprising:
   providing a plurality of cork particles;
   adding a binder material to the plurality of cork particles to form a mixture of the plurality of cork particles and the binder material;
   transferring the mixture to a mold configured with a cavity in the shape of a midsole of an article of footwear;
   applying energy to the mixture, wherein the energy is applied using microwave radiation and fuses the plurality of cork particles with the binder material to form a cork composite material;
   cooling the mixture, wherein cooling the mixture solidifies the cork composite material in the shape of the midsole; and
   removing the midsole from the mold.

12. The method of claim 11, wherein the energy comprises microwave radiation being supplied at a power between about 6 kW and about 18 kW.

13. The method of claim 11, wherein the energy is applied for less than 30 seconds.

14. The method of claim 11, wherein cooling the mixture comprises contacting the mold with a liquid.

15. The method of claim 14, wherein the mold comprises channels, wherein the channels are configured to direct a flow of the liquid.

16. The method of claim 12, wherein after transferring the mixture to the mold, and before removing the midsole from the mold, no external pressure is applied to the mixture, the mold, and the midsole.

17. A method of fabricating a midsole of an article of footwear containing cork composite material, comprising:
   providing a mixture having cork particles and a binder material;
   transferring the mixture to a mold; and
   applying energy to the mixture, wherein the energy applied to the mixture includes electromagnetic waves.

18. The method of claim 17, wherein the electromagnetic waves are applied to the mixture using a microwave.

19. The method of claim 17, wherein the energy is applied for less than 30 seconds.

* * * * *